(12) United States Patent
Falla et al.

(10) Patent No.: US 7,556,553 B2
(45) Date of Patent: Jul. 7, 2009

(54) METHOD FOR MOLDING LOFTED MATERIAL WITH LAMINATED SUPPORT LAYER AND DECORATIVE PANEL AND GARMENT MADE

(75) Inventors: Gloria Falla, Demarest, NJ (US); Roger D. Warren, Claremont, NC (US); Thomas S. Wood, Mooresville, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 0 days.

(21) Appl. No.: 11/152,859

(22) Filed: Jun. 15, 2005

(65) Prior Publication Data

US 2006/0025041 A1 Feb. 2, 2006

Related U.S. Application Data

(63) Continuation-in-part of application No. 11/150,985, filed on Jun. 13, 2005, which is a continuation-in-part of application No. 10/631,474, filed on Jul. 31, 2003.

(51) Int. Cl.
A41D 3/00 (2006.01)
(52) U.S. Cl. .............................. 450/39; 450/57; 450/92; 450/93
(58) Field of Classification Search .............. 450/41–52, 450/54–57, 37, 39; 2/92–94, 243.1, 73; 264/157, 160, 257, 258, 291, 292, 294, 320, 264/321, 163, 145, 148; 156/245, 73.1, 60, 156/73.3, 73.4
See application file for complete search history.

(56) References Cited

U.S. PATENT DOCUMENTS

| | | | | |
|---|---|---|---|---|
| 2,128,600 A | * | 8/1938 | Bergmann | .................... 450/53 |
| 2,190,807 A | | 2/1940 | Steinberger | |
| 2,378,908 A | * | 6/1945 | Blum | ........................... 450/39 |
| 2,540,521 A | * | 2/1951 | Hoffman | ...................... 450/92 |
| 2,541,147 A | * | 2/1951 | Becker | ........................ 450/51 |
| 2,609,539 A | | 9/1952 | Shearer | |
| 2,629,099 A | * | 2/1953 | Phillips | ....................... 450/90 |
| 3,021,845 A | | 2/1962 | Smith | |
| 3,058,154 A | | 10/1962 | Howard et al. | |
| 3,101,717 A | * | 8/1963 | Korman | ....................... 450/39 |

(Continued)

FOREIGN PATENT DOCUMENTS

EP 1 440 626 7/2004

(Continued)

*Primary Examiner*—Gloria Hale
(74) *Attorney, Agent, or Firm*—Womble Carlyle Sandridge & Rice PLLC

(57) ABSTRACT

A method for making a garment having a lofted assembly having an inner laminated support fabric and an outer panel and the garment produced are provided. The method includes the steps of positioning a support fabric on a lofted material; laminating the support fabric to the lofted material to form a lofted assembly; positioning the lofted assembly in a molding apparatus having at least a first mold and a second mold, closing together the first mold and the second mold thereby sandwiching the lofted assembly therebetween and while maintaining a uniform preset gap between said first mold and the second mold so that the inherent loft characteristics of the lofted assembly are substantially preserved. Then the outer panel is stitched to an outer side of said lofted assembly.

17 Claims, 7 Drawing Sheets

U.S. PATENT DOCUMENTS

| | | | |
|---|---|---|---|
| 3,167,816 A | 2/1965 | Howard et al. | |
| 3,266,495 A | 8/1966 | Sachs | |
| 3,320,346 A | 5/1967 | Galitzki et al. | |
| 3,331,906 A | 7/1967 | Adams | |
| 3,399,678 A | 9/1968 | Faron | |
| 3,464,418 A | 9/1969 | Silverman | |
| 3,527,858 A | 9/1970 | Braxton et al. | |
| 3,799,174 A | 3/1974 | Howard | |
| 3,799,721 A | 3/1974 | Howard | |
| 3,799,727 A | 3/1974 | Howard | |
| 3,799,728 A | 3/1974 | Howard | |
| 3,880,561 A | 4/1975 | Ferro | |
| 3,891,378 A | 6/1975 | Belmuth et al. | |
| 3,934,593 A * | 1/1976 | Mellinger | 450/56 |
| 3,947,207 A | 3/1976 | Magidson et al. | |
| 3,962,392 A | 6/1976 | Conner, Jr. | |
| 3,981,670 A | 9/1976 | Levy | |
| 4,008,029 A | 2/1977 | Shokite | |
| 4,013,750 A | 3/1977 | Magidson et al. | |
| 4,025,597 A | 5/1977 | Sawamoto | |
| 4,080,416 A | 3/1978 | Howard | |
| 4,127,374 A | 11/1978 | Ammeraal | |
| 4,143,662 A * | 3/1979 | Fisher | 450/53 |
| 4,162,885 A | 7/1979 | Asel | |
| 4,172,002 A | 10/1979 | Gluckin | |
| 4,244,249 A | 1/1981 | DiTullio | |
| 4,250,137 A | 2/1981 | Riedler | |
| 4,284,400 A | 8/1981 | Kaspar et al. | |
| 4,372,321 A * | 2/1983 | Robinson | 450/39 |
| 4,645,629 A | 2/1987 | Stern | |
| 5,098,330 A | 3/1992 | Greenberg | |
| 6,083,080 A | 7/2000 | Lawson et al. | |
| 6,165,047 A | 12/2000 | Scott et al. | |
| 6,213,841 B1 | 4/2001 | Kuo | |
| 6,306,006 B1 | 10/2001 | Cheng | |
| 6,398,620 B1 * | 6/2002 | Huang | 450/57 |
| 6,406,352 B1 | 6/2002 | Cheng | |
| 6,409,865 B1 | 6/2002 | Yates | |
| 6,425,800 B1 | 7/2002 | Huang | |
| 6,439,959 B1 | 8/2002 | Magrone et al. | |
| 6,796,876 B2 | 9/2004 | Luk | |
| 6,805,610 B2 | 10/2004 | Luk | |
| 6,805,611 B2 | 10/2004 | Luk | |
| 6,805,612 B1 | 10/2004 | Luk | |
| 6,811,464 B2 | 11/2004 | Li | |
| 6,837,772 B1 | 1/2005 | Luk | |
| 6,878,033 B2 | 4/2005 | Luk | |
| 6,881,123 B1 | 4/2005 | Klakauskas | |
| 2002/0002023 A1 | 1/2002 | Nakanishi | |
| 2003/0181129 A1 | 9/2003 | Getman | |
| 2004/0224604 A1 | 11/2004 | Luk | |
| 2004/0224606 A1 | 11/2004 | Lin | |

FOREIGN PATENT DOCUMENTS

| | | |
|---|---|---|
| JP | 2001-234402 | 8/2001 |
| JP | 2002-088523 | 3/2002 |
| JP | 2002-155403 | 5/2002 |

* cited by examiner

METHOD FOR MOLDING LOFTED MATERIAL WITH LAMINATED SUPPORT LAYER AND DECORATIVE PANEL AND GARMENT MADE

RELATED APPLICATION

This application is a continuation-in-part of U.S. patent application Ser. No. 11/150,985, filed on Jun. 13, 2005, now pending and fully incorporated herein by reference, which is a continuation-in-part of U.S. patent application Ser. No. 10/631,474, filed on Jul. 31, 2003.

BACKGROUND OF THE INVENTION

1. Field of the Invention

The present invention relates to a method for molding garments and the garments made. More particularly, the present invention relates to a method for molding a lofted material having a laminated support layer an decorative panel and the resultant garment.

2. Description of the Prior Art

Various methods and mechanisms for molding different types and assemblies of material have been developed and are known. For example, U.S. Pat. No. 3,464,418 provides an apparatus and method for making brassiere pads from bonded non-woven fibrous batting material, U.S. Pat. No. 4,025,597 provides a method of making a brassiere cup from a soft fibrous board material, U.S. Pat. No. 4,080,416 provides a method for making multi-layered seamless brassiere pads, and U.S. Pat. No. 4,250,137, which provides a process for preparing breast pads or fronts such that the pads are centrally soft and peripherally firmer.

Notwithstanding that which is known, there remains a continuing need for improved methods for molding lofted material having a laminated support layer to provide a three dimensional shape thereto without compromising the loft characteristics associated with such material. Problems heretofore associated with various processes of molding a lofted material include at least the following: (1) thinning of material at points of increased pressure or applied heat, or both, such as for example, the apex of a bra cup or pad, (2) requiring relatively complicated or additional structural elements, or both to facilitate a desired result, for example, spacer devices or vacuum systems, and (3) requiring that heat, pressure or both be avoided at relatively substantial portions of the material being molded, which can complicate the molding process.

SUMMARY OF THE INVENTION

It is an object of the present invention to provide method for molding lofted assembly having an inner laminated support layer that is connected to an outer panel.

It is another object of the present invention to provide a garment that is made from a lofted material that has a inner laminated support layer that is molded to maintain the loft characteristics of such lofted material and an outer panel.

It is yet another object of the present invention to provide a garment that is molded from a lofted material that has an inner laminated support layer and a decorative outer panel.

It is still yet another object of the present invention to provide a brassiere that is molded from a lofted assembly having a lofted material and an inner laminated synthetic support layer and a decorative panel that is molded to provide support for a average to large sized brassieres.

These and other objects and advantages of the present invention are achieved by a molding apparatus with at least a first die or mold with a projecting element and a first level portion, and a second die or mold with a recessed element and a second level portion. The projecting element and the recessed element are formed such that when the first level portion of the first mold and the second level portion of the second mold are brought into relatively close relation, a uniform preset distance or gap is created between the projecting element and the recessed element. The gap is preferably adjustable to accommodate the loft of different materials. The first mold and second mold each are preferably selectively and/or independently heatable and configured as appropriate to facilitate the following material molding method.

The method for molding the lofted material essentially comprises the steps of first placing a pre-cut support layer that is in a pre-determined position on a piece of lofted material, laminating the two materials together to form a lofted assembly, and positioning the lofted assembly in the molding apparatus. Then, closing the first mold in relation to the second mold, or vice-versa, sandwiching the lofted assembly therebetween such that the portion of the lofted assembly situated between the first and second level portions is compressed and the portion of the lofted assembly situated between the projecting element and recessed element is compressed only to the extent desired or not at all. The extent of compression being adjustable. Following this closing step is a step of opening the first mold in relation to the second mold after a period of selectively providing pressure and/or heat as appropriate for the desired molding result. Then stitched to the molded lofted assembly on an opposite side from the support layer is an outer preferably, decorative panel. The resulting molded lofted assembly preferably provides a balance of comfort, support, durability and aesthetic appeal.

BRIEF DESCRIPTION OF THE DRAWINGS

Other and further objects, advantages and features of the present invention will be understood by reference to the following specification in conjunction with the accompanying drawings, in which like reference characters denote like elements of structure.

DETAILED DESCRIPTION OF THE INVENTION

Figure 1:
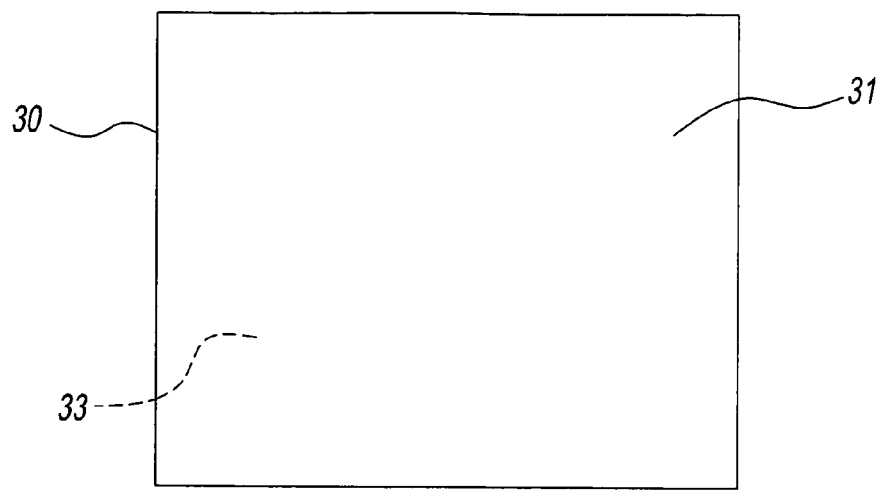
FIG. 1 is a top view of the lofted material that is to be molded in accordance with an illustrative embodiment of the present invention.

Referring to the drawings and, in particular to FIG. 1, there is shown an illustrative embodiment of the lofted material generally represented by reference numeral 30. In this disclosure, the term lofted material 30 includes foam and circularly knitted and/or warp knitted single ply materials that can be a variety of materials or combination of materials (batting, spacer fabric, etc.). Spacer fabric could be a polyester and/or nylon fabric. Lofted material 30 has a inner side or first side 31 that contacts the skin of the wearer and an outer side or second side 33 that faces in an outward direction opposite inner side 31. Lofted material 30 is sized to form a deep breast-receiving cup for a brassiere after being molded.

Figure 2:
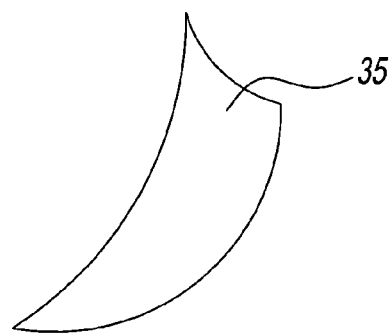
FIG. 2 is a top view of the pre-cut synthetic support layer that is to be laminated to the lofted material in accordance with the present invention.

Referring to FIG. 2, support layer 35 is shown. Support layer 35 is cut in the shape of a crescent to ensure a comfortable and close fit at the lower lateral inner surface portion of the finished breast-receiving cup. Although the shape of support layer 35 is shown as a crescent, other shapes capable of offering comfort and support to the wearer could also be used. Support layer 35 can be any synthetic material or natural material. Preferably, the support fabric 35 is a warp knit material. In all instances, support layer 35 provides the level of comfort and support to the breasts of the wearer that would otherwise not be available without the enhanced support.

Figure 3:
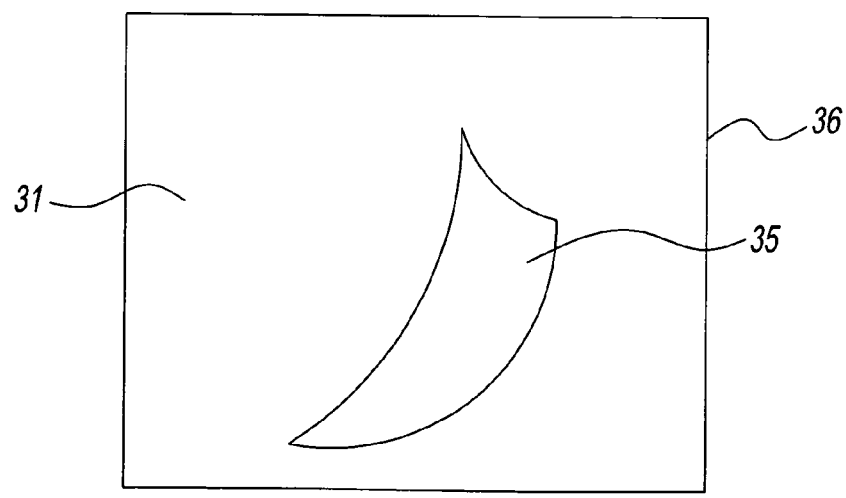
FIG. 3 is top view of the laminated assembly of lofted material and the synthetic support layer in accordance with the present invention.

In FIG. 3, support layer 35 is pre-positioned on lofted material 30 on inner side 31 before the two pieces of fabric are laminated together. The temperature that is required to laminate support layer and lofted material 30 is approximately 320° F. to 360° F. The lamination process is of a temperature that will preserve the loft and the aesthetic appeal of the lofted material 30 and support layer 35. After the lamination process, lofted material 30 and support layer 35 together form lofted assembly 36.

Figure 4:
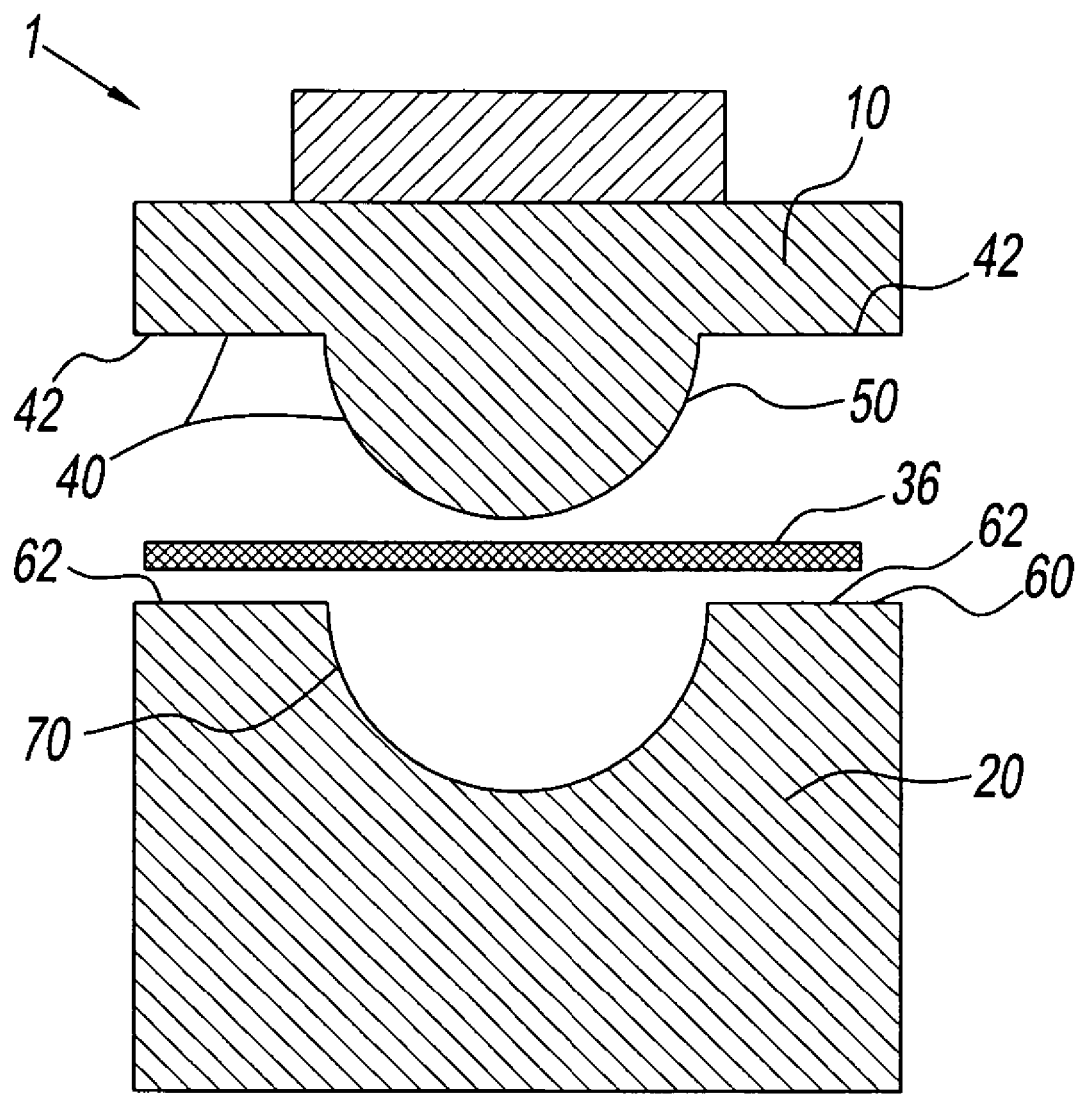
FIG. 4 is a cross-sectional side view of an apparatus for molding a lofted assembly in accordance with an illustrative embodiment of the present invention with the apparatus shown in open position.

Referring to the drawings and, in particular to FIG. 4, there is shown an illustrative embodiment of an apparatus for molding lofted assembly 36. The apparatus 1 preferably has at least two mold elements, a first mold 10 and a second mold 20. Preferably, the first mold 10 and the second mold 20 are complementary to one another.

Preferably, first mold 10 and second mold 20 cooperate to mold or form a lofted assembly 36 positioned therebetween into a three-dimensional shape, such as, for example, that required by molded brassiere pads. Preferably, lofted assembly 36 can be any of a variety of materials or combination of materials and can be fashioned into a variety of forms, such as for example, a garment.

Figure 9:
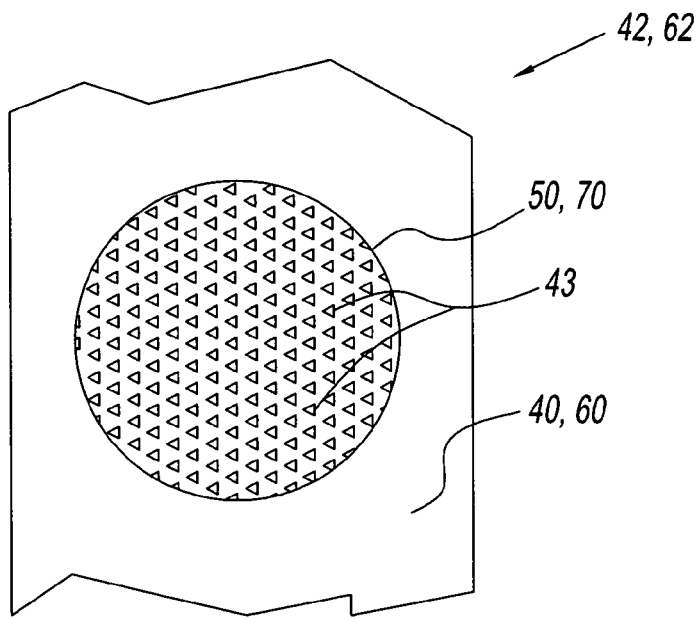
FIG. 9 is a plan view of yet another alternative apparatus for molding a lofted assembly.
Figure 10:
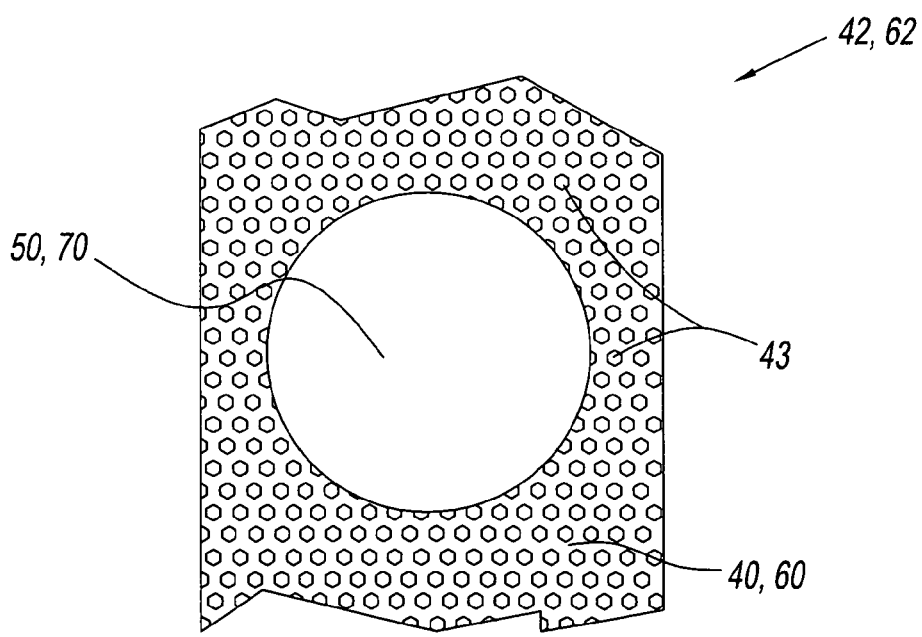
FIG. 10 is a plan view of still another alternative apparatus for molding a lofted assembly.
Figure 11:
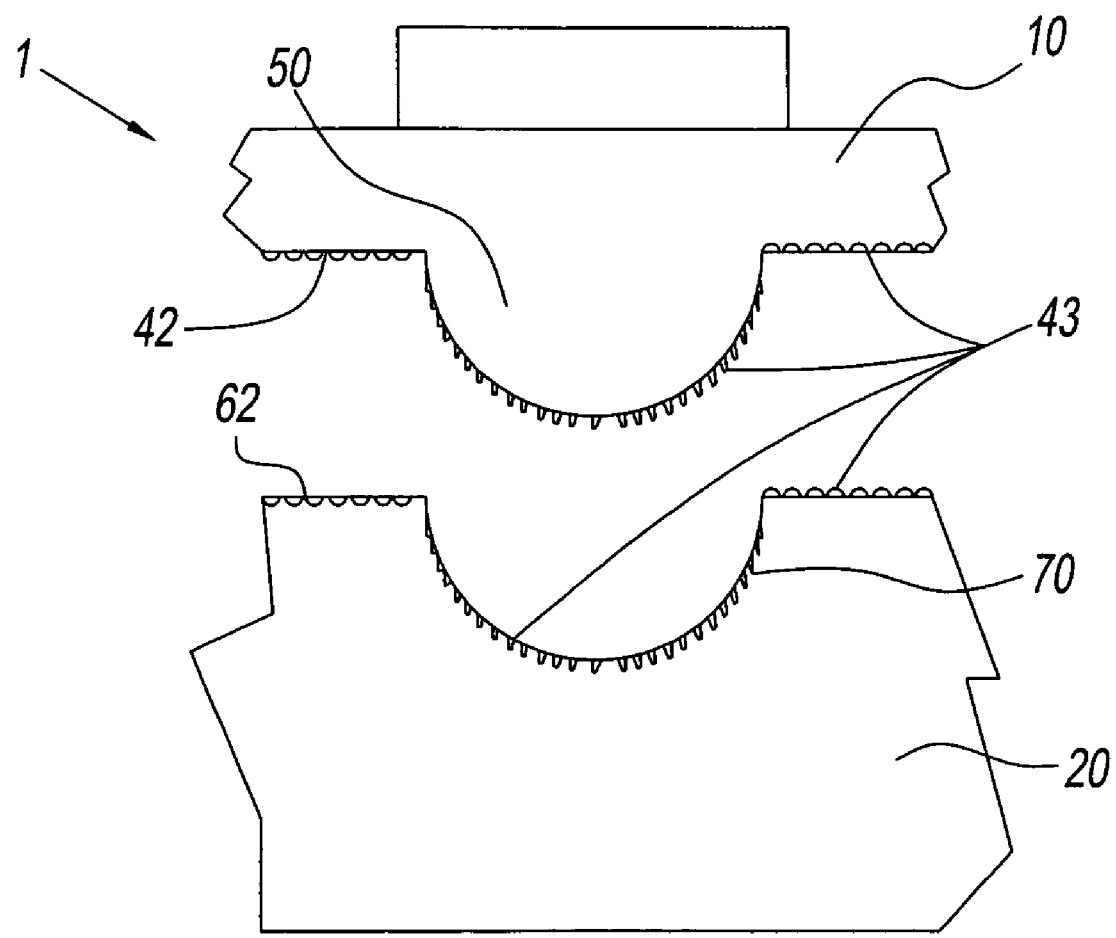
FIG. 11 is a side sectional view of yet still another alternative apparatus for molding a lofted assembly.

First mold 10 preferably has at least one first contact surface 40 with at least one projecting element 50 in the form of a dome. First contact surface 40 preferably also has a first level portion 42 about projecting element 50. First contact surface 40 may also have any of a variety of other surface elements 43 associated therewith, such as for example, one or more nodes, dimples, and/or teeth as shown in FIGS. 9 through 11. First contact surface 40 can be interchangeably associated with first mold 10. First mold 10 can be interchangeably associated with apparatus 1. The interchangeability of first contact surface 40 and/or first mold 10 preferably provides apparatus 1 with further diversity in application or use.

Figure 7:
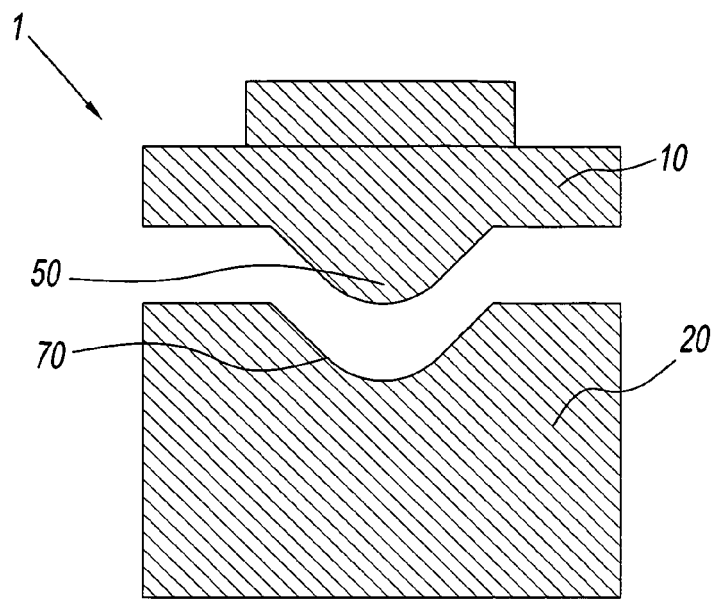
FIG. 7 is a side sectional view of an alternative apparatus for molding a lofted assembly.
Figure 8:
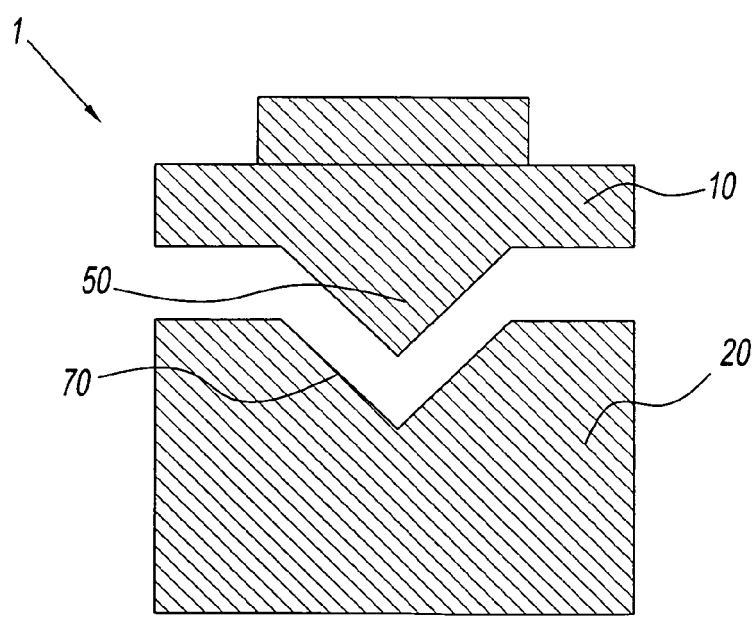
FIG. 8 is a side sectional view of another alternative apparatus for molding a lofted assembly.

Preferably, first mold 10, first contact surface 40, projecting element 50, and/or first level portion 42 can be heatable. This heating can be accomplished in any of a variety of ways, such as for example, via electric heating wires or rods associated with first mold 10. These heating wires or rods could preferably conduct or transmit heat, via first mold 10, as appropriate, to provide any and/or all of the aforementioned elements thereof with sufficient heat for effective molding under a variety of different molding parameters. First mold 10 can preferably have any shape, size, and/or configuration suitable for accomplishing one or more different molding operations. See, for example, FIGS. 7 and 8, which show alternative embodiments of first mold 10. It is noted that the present invention is not limited to those configurations discussed and/or shown and that other configurations are also within the scope of the present invention.

It is also noted, with regard to surface elements 43 discussed above, that surface elements 43 are preferably suitable for achieving a variety of different molding effects. For example, surface elements 43 can be on either and/or both projecting element 50 and first level portion 42 to interact with lofted assembly 36 during a molding process. Surface elements 43 can be, for example, one or more piercing elements, heating or cooling elements, cushioning or insulating elements, or any combination of the same. Other similar types of elements may also be used and are within the scope of the present invention.

Referring again to FIG. 4, second mold 20 has at least one second contact surface 60 with at least one recessed element 70 in the form of a dish. Preferably, recessed element 70 is complementary to and cooperative with projecting element 50 of first mold 10. Second contact surface 60 preferably also has a second level portion 62 about recessed element 70. Second contact surface 60 may also have surface elements 43 associated therewith. Second contact surface 60 can be interchangeably associated with second mold 20, and, the second mold can be interchangeably associated with apparatus 1. The interchangeability of second contact surface 60 and/or second mold 20 preferably provides apparatus 1 with further diversity in application or use.

Preferably, second mold 20, second contact surface 60, recessed element 70, and/or second level portion 62 can be heatable. Such heating can be accomplished in any of a variety of ways, such as, for example, by electric heating wires or rods associated with second mold 20. These heating wires or rods could preferably conduct or transmit heat, via second mold 20, as appropriate to provide any and/or all of the aforementioned elements thereof with sufficient heat for effective molding under a variety of different molding parameters. Second mold 20 can preferably have any shape, size, and/or configuration suitable for accomplishing one or more different molding operations in cooperation with mold 10. See, for example, FIGS. 7 and 8, which show alternative embodiments of second mold 20. It is noted that the present invention is not limited to those configurations discussed and/or shown and that other configurations are also within the scope of the present invention.

As with the first mold 10, surface elements 43 for providing a variety of different molding effects that can be on either and/or both recessed element 70 and second level portion 62 to interact with lofted assembly 36 during the molding process.

Figure 5:
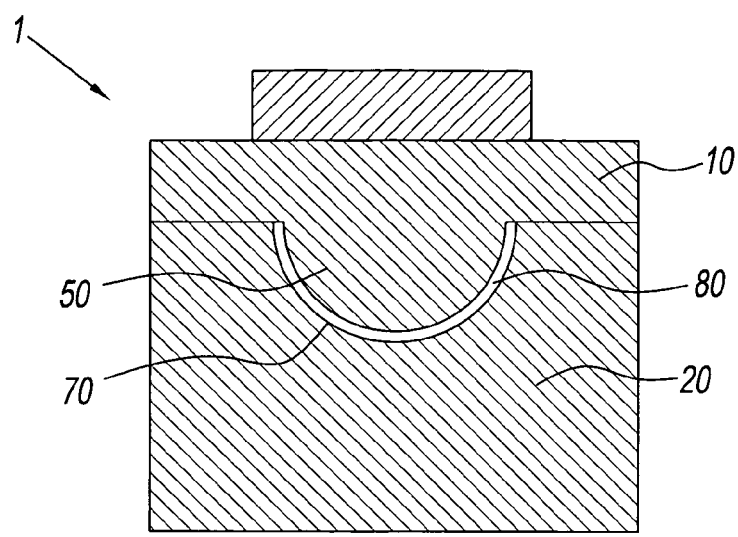
FIG. 5 is a cross-sectional side view of the apparatus of FIG. 4 with the apparatus shown in a closed position.
Figure 6:
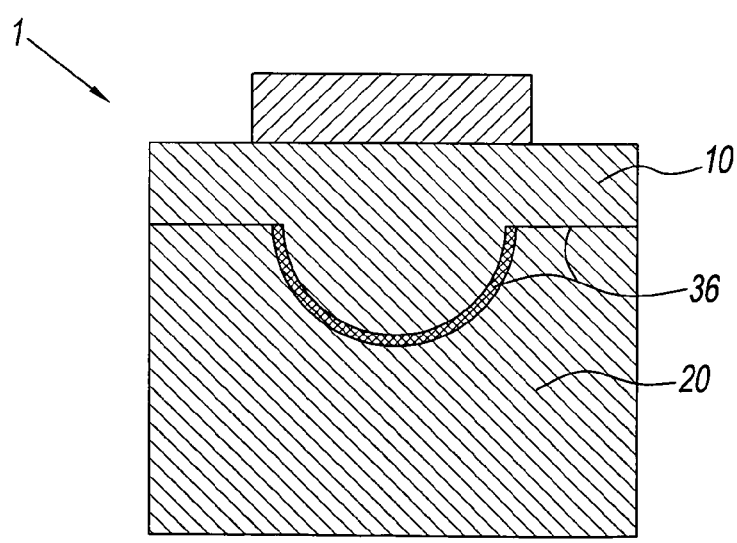
FIG. 6 is a side sectional view of the apparatus of FIG. 4, reflecting a forming step in accordance with an illustrative embodiment of the present invention.

Referring to FIGS. 5 and 6, having described some of the preferred elements of an illustrative embodiment of the present invention, first and second molds 10, 20, respectively, are preferably configured to engage one another such that when first level portion 42 of first mold 10 and second level portion 62 of second mold 20 are brought into relatively close relation, a uniform preset distance or gap 80 is created between projecting element 50 and recessed element 70. Gap 80 preferably has an extent of about 0.1 inches. However, gap 80 can also have any extent appropriate for accomplishing a desired molding operation. Hence, gap 80 can preferably be adjusted to accommodate the loft characteristics associated with a variety of different materials. This adjusting feature can be accomplished in different ways, such as, for example, via the preferred interchangeability of first and second molds 10, 20 and/or first and second contacting surfaces 42, 62. Gap 80 may also be adjusted to influence the degree of loft associated with a material. That is, gap 80 can be reduced to provide a desired finish or effect to a lofted assembly 36. Thus, it is apparent the preservation of the inherent loft characteristics associated with a lofted assembly is preferably independent of the heat, pressure and/or time associated with a particular molding process. The present invention efficiently and effectively preserves the inherent loft characteristics associated with a lofted assembly during the molding process.

Figure 12:
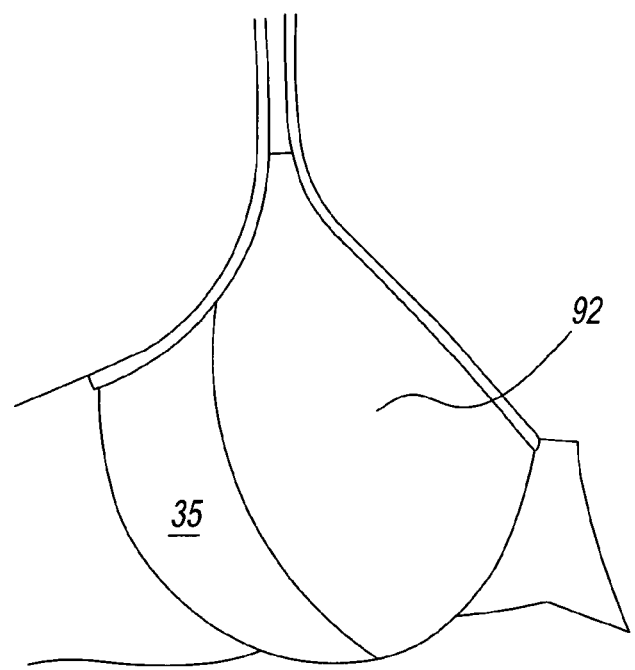
FIG. 12 is a rear view of the lofted assembly molded in the form of a breast-receiving cup.

The process of molding lofted assembly 36 preferably includes at least the following steps. Referring to FIGS. 1 and 4 through 6, lofted assembly 36 is first positioned in apparatus 1 between first mold 10 and second mold 20. Lofted assembly 36 is positioned in apparatus 1 such that inner side 31 having support layer 35 is facing projecting element 50. On lofted assembly 36, support layer 35 is positioned so that after the molding process, support layer 35 will be positioned at the lower lateral inner side edge of lofted assembly 36. Referring to FIG. 2, first mold 10 is then closed in relation to second mold 20, or vice-versa, to sandwich lofted assembly 36 therebetween. Preferably, at least a portion of lofted material 30 is situated in gap 80 so that the inherent loft characteristics thereof are substantially preserved while at least another portion of lofted assembly 36 is substantially compressed between first and second level portions 42, 62 of first and second contact surfaces 40, 60, respectfully. Next, first mold 10 is opened in relation to second mold 20, or vice-versa, after an appropriate amount of heat and/or pressure has been applied for an appropriate period of time. Referring to FIG. 12, formed lofted assembly 92 is removed from apparatus 1 to perform any additional operations required for obtaining a desired effect, such as for example, adding an outer panel or an outer decorative panel or eliminating any excess or unwanted material as appropriate to leave formed lofted assembly 92 with a three dimensional shape.

Figure 13:
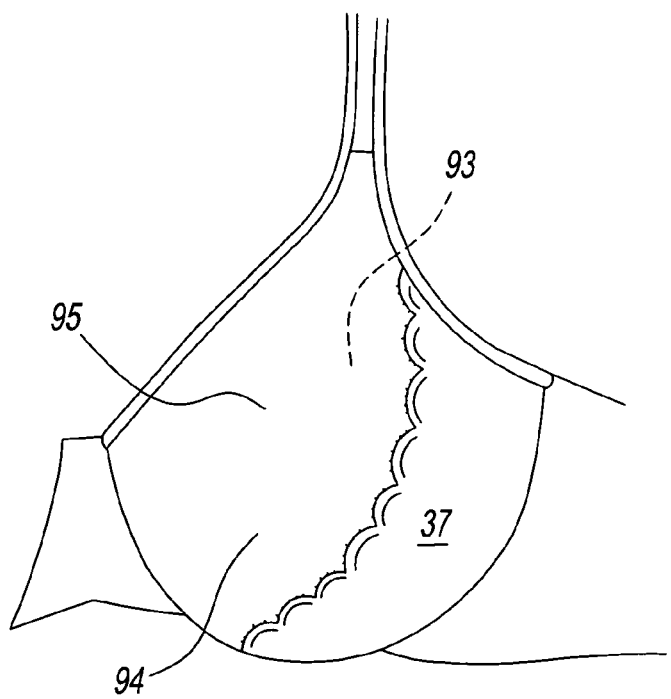
FIG. 13 is a front view of the lofted assembly molded in the form of the breast-receiving cup with the decorative panel.

Referring to FIGS. 12 and 13, finished cup 95 is shown. Cup 95 has a first or inner side 93 and a second or outer side 94. First or inner side 93 has support layer 35 connected at a lower lateral edge and second or outer side 94 has an outer panel 37 connected to a lower lateral edge in a position that is opposite support layer 35. Outer panel 37 is preferably crescent shaped. Outer panel 37 is preferably lace although, other materials such Jacquard, woven or knitted materials could also be used. Outer panel 37 is preferably decorative and can have any design such as, for example, a floral design or a geometric pattern, although any pattern could be used. Panel 37 is connected to breast receiving cup 95 preferably by stitching although other methods for connecting decorative panel that preserve the aesthetic appeal of breast receiving cup 95 could also be used. Together lofted material 36, support layer 35 and decorative panel 37 form finished cup 95.

Referring to FIG. 13, the molding process of cup 95 results in a molded cup for a brassiere that accommodates wearers needing from average to large sized brassieres. Such a brassiere may include such conventional elements as side panels connected to one of a pair of breast receiving cups and shoulder straps connected to a separate one of a pair of breast receiving cups. The material of support layer 35 is of such stitch pattern and material that it limits the elasticity of the lofted material 30 from which cup 95 is made. By limiting the elasticity of the lofted material 30, wearers that require substantial breast support can wear cup 95 with comfort and confidence.

The present invention having been thus described with particular reference to the preferred forms thereof, it will be obvious that various changes and modifications may be made therein without departing from the spirit and scope of the present invention as defined herein.

What is claimed is:

1. A molded breast covering garment comprising:
   a lofted material having an inner side and an outer side;
   a support layer;
   an outer panel; and
   wherein said support layer is laminated and molded at only a lower lateral portion to said inner side of said lofted material and said outer panel is connected to said outer side of said lofted material to form a breast receiving cup with the outer panel positioned at only the lower lateral portion of the cup.

2. The molded garment of claim 1, wherein said support layer is crescent shaped having a central area and ends, the central area being wider than the ends.

3. The molded garment of claim 1, wherein said outer panel is crescent shaped.

4. The molded garment of claim 1, wherein said outer panel is a decorative panel.

5. The molded garment of claim 1, wherein said support layer is selected from the group consisting of a synthetic fabric, a natural fabric, and combinations thereof.

6. The molded garment of claim 1, wherein said support layer is warp knitted.

7. The molded garment of claim 1, wherein said lofted material is selected from the group consisting of foam, spacer fabric, circularly knitted single ply materials, warp knitted single ply materials, and combinations thereof.

8. The molded garment of claim 1, wherein said outer panel is selected from the materials consisting of woven material, lace, knit material, Jacquard material, and combinations thereof.

9. The molded garment of claim 1, wherein said garment is a brassiere.

10. A brassiere comprising:
    a pair of breast receiving cups;
    a pair of side panels, each side panel being connected to a separate one of said pair of breast cups, wherein each of said pair of breast receiving cups has a support layer, an outer panel, and a lofted material;
    wherein said lofted material has an inner side and an outer side, said support layer being laminated and molded to only a lower lateral position of said inner side and said outer panel being connected to said outer side, the outer panel positioned at only the lower lateral portion of each cup; and
    a pair of shoulder straps, each shoulder strap being connected to a separate one of said pair of breast receiving cups.

11. The brassiere of claim 10, wherein said outer panel is stitched to said lofted material.

12. The brassiere of claim 10, wherein said support layer is crescent shaped having a central area and ends, the central area being wider than the ends.

13. The brassiere of claim 10, wherein said support layer is selected from the group consisting of synthetic fabric, natural fabric, and combinations thereof.

14. The brassiere of claim 10, wherein said support layer is warp knitted.

15. The brassiere of claim 10, wherein said lofted material is selected from the group consisting of foam, spacer fabric, circularly knitted single ply materials, warp knitted single ply materials, and combinations thereof.

16. The brassiere of claim 10, wherein said outer panel is selected from the group consisting of woven material, lace, knitted material, Jacquard material, and combinations thereof.

17. The brassiere of claim 16, wherein said outer panel is a decorative panel.

* * * * *